July 7, 1953  E. V. HARDWAY, JR  2,644,902
ELECTROKINETIC DEVICE AND ELECTRODE
ARRANGEMENT THEREFOR
Filed Nov. 27, 1951

POROUS SINTERED METAL ELECTRODES.

POROUS DEPOSITED METAL FILMS

INVENTOR
EDWARD V. HARDWAY, JR.

BY Stone, Boyden & Mack
ATTORNEYS

Patented July 7, 1953

2,644,902

UNITED STATES PATENT OFFICE 2,644,902

ELECTROKINETIC DEVICE AND ELECTRODE ARRANGEMENT THEREFOR

Edward V. Hardway, Jr., Richmond, Va.

Application November 27, 1951, Serial No. 258,492

14 Claims. (Cl. 310—2)

This invention relates to electrokinetic instruments and particularly to electrokinetic instruments of the type disclosed in my co-pending application entitled Electrokinetic Measuring Instruments, Serial Number 258,493, filed even date herewith.

The present invention is especially concerned with electrokinetic transducer cells comprising an enclosure, a porous plug situated within the enclosure to divide the interior thereof into two chambers, the chambers, being filled with an electrokinetic liquid and an electrode disposed in each chamber. In such cells, the chambers may be closed by diaphragms or the like so that impulses representative of the variable to be measured can be imparted to the liquid.

As fully discussed in my aforesaid co-pending application, such cells have long been known in the art but it has heretofore been impossible to obtain an electrokinetic cell which is satisfactory in commercial use. I have discovered that one of the primary difficulties with prior art proposed electrokinetic cells has been the high output impedance resulting from the nature of the electrodes employed. Often, pin type electrodes have been used, and these have been spaced at a distance from the porous plug. With such an electrode arrangement, the series electrode resistance can readily amount to several hundred thousand ohms. Then, if the cell electrodes are connected to a fifty foot 20 mmf. per foot electrical cable, the error resulting from the high impedance will amount to as much as 5% at a frequency of the measured variable of only 100 C. P. S.

A primary object of this invention is to provide a novel electrokinetic cell structure in which such errors are minimized. In general, the invention attains this object by incorporating in an electrokinetic cell electrodes of permeable form in intimate contact with the porous plug of the disc.

A further object of this invention is to provide an electrokinetic cell in which the series electrode impedance is minimized without necessitating complicated and expensive cell construction.

Yet another object of the invention is to provide an electrokinetic cell in which the series electrode impedance is minimized, assembly of the cell is simplified, and durability of the structure, and particularly the porous plug, is assured.

In order that these and other objects of the invention may be understood in detail, reference is had to the accompanying drawings which form a part of this specification and in which.

My invention is based upon the discovery that the efficiency and practicability of electrokinetic cells can be greatly increased by employing therein permeable electrodes which are in intimate contact with the porous plug of the cell and which, preferably, overlie substantially the entire exposed faces of the plug. Preferably, the electrodes should be of sheet form, though as will be seen hereinafter, certain embodiments of my invention employ as electrodes relatively thick bodies of permeable conductive material.

By stating that the electrodes are permeable, I mean that they are of such discontinuous formation as to allow relatively free passage of liquid therethrough. As will be seen, suitable permeable materials include wire fabric, sintered metal, evaporated or otherwise deposited metal films, and perforated metal sheets. As fully disclosed in my co-pending application Serial Number 258,493, the electrodes must be of an electrically conductive material substantially unaffected by the electrokinetic liquid employed in the cell. Therefore, the electrodes are usually of nickel, silver, platinum, copper or other metal inert to the liquid used. Aluminum electrodes may be used when the electrokinetic liquid is acetonitrile.

Figure 1:
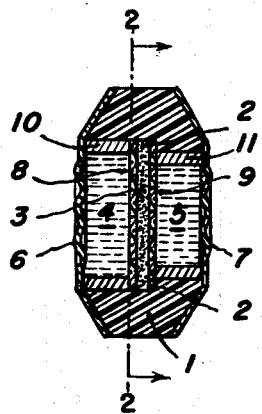
Fig. 1 is an axial sectional view of an electrokinetic cell embodying the invention.
Figure 2:
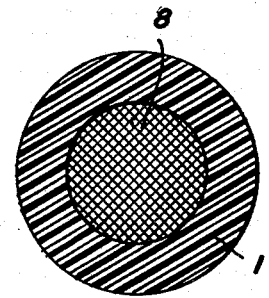
Fig. 2 is a transverse sectional view taken on the line 2—2, Fig. 1.

Referring now to the drawings in detail, and first to Figs. 1 and 2 thereof, it will be seen that one embodiment of the invention comprises an insulating ring 1 having an annular internal transverse shoulder 2. The porous plug of the cell consists of a thin disc 3 seated against the shoulder 2 in sealing relation with the ring 1 to divide the interior of the ring into two chambers 4 and 5. The chambers 4 and 5 are each filled with a suitable electrokinetic liquid and are sealed by flexible metal diaphragms 6 and 7, respectively, which form the contacts for the cell. Overlying the entire surfaces of the opposite faces of the disc 3 are electrodes 8 and 9 of fine mesh wire fabric. The electrodes 8 and 9 are held in intimate face-to-face contact with the disc 3 by metal rings 10 and 11, respectively, which fit snugly within the bore of the insulating ring 1. The ring 10 bears at one end against the electrode 8 and at the other end against the metal diaphragm 6, thus forming an electrical connection between the diaphragm and the electrode. Similarly, the ring 11 both mechanically and electrically bridges the space between the electrode 9 and the diaphragm 7.

As a typical example, the ring 1 may be of polytetrafluoroethylene, the electrokinetic liquid acetonitrile, and the electrodes 8 and 9 of fine mesh aluminum wire cloth, all other metal parts in contact with the liquid being of a metal which is inert to acetonitrile. Thus the rings 10 and 11 may be of aluminum overlay. Preferably, all metal parts in contact with the liquid are of the same metal to prevent electrochemical action.

Figure 3:
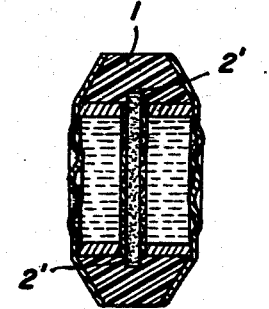
Fig. 3 is an axial sectional view of another electrokinetic cell constructed in accordance with the invention.

In the embodiment just described, it will be noted that the ring 10 serves to hold the porous disc 3 against the shoulder 2. Alternatively, as seen in Fig. 3, the insulating ring 1 may be provided with an internal transverse groove 2' in which the periphery of the porous disc is seated. The structure of Fig. 1 has the advantage of simplicity of assembly. On the other hand, the structure of Fig. 3 takes advantage of the tendency of the insulating ring to be self-sealing, as to the connection between the disc and ring, when the cell is clamped tightly about its periphery, as in the instrument disclosed in my co-pending application Serial Number 258,493.

Figure 4:
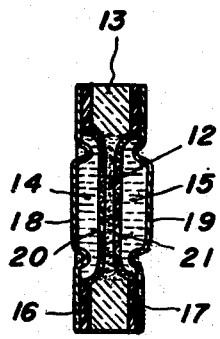
Fig. 4 is an axial sectional view of an electrokinetic cell representing a further embodiment of the invention.

In Fig. 4, there is illustrated a cell structure more especially intended for measurement of relatively low pressure. Here, the porous plug 12 is of microporous fritted glass and is fused at its periphery to the internal surface of a Pyrex glass or like inorganic insulating ring 13, so that the plug or disc 12 divides the interior of the ring into two chambers 14 and 15. Sealing gaskets 16 and 17 overlie the end faces of the ring 13, and the chambers 14 and 15 are closed by flexible metal diaphragms 18 and 19, respectively. The fused connection between the disc 12 and the ring 13 is preferably filleted, as shown, so that the chambers 14 and 15 may be described as relatively shallow cups with no abrupt corners. Electrodes 20 and 21 are disposed in the chambers 14 and 15 respectively, overlying the corresponding faces of the disc 12 and the ring 13. The electrodes are of permeable sheet form, preferably fine mesh wire cloth, and are pressed into the chambers 14 and 15 so as to assume the cupped shape thereof and lie in intimate face-to-face contact with the disc 12 and ring 13. Further, the electrodes 20 and 21 are of sufficient area to extend over the complete interior surfaces of the chambers 14 and 15 so as to be in contact mechanically and electrically with the diaphragms 18 and 19, respectively. Thus, as is the case with the cells of Figs. 1–3, the diaphragms constitute the exterior contacts of the cell. The construction of Fig. 4, eliminating the rings 10 and 11, Fig. 1, is particularly advantageous where a flat cell structure is required. It will be understood, of course, that the chambers 14 and 15 are filled with a suitable electrokinetic liquid.

Figure 5:
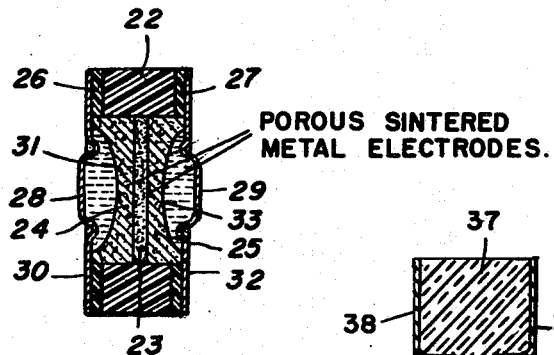
Fig. 5 is an axial sectional view of an electrokinetic cell representing yet another embodiment of the invention.

Fig. 5 shows a further embodiment of the invention particularly useful where the porous plug is a very thin disc and where the plug is subjected to relatively heavy shock pressures. As fully described in the aforementioned co-pending application Serial Number 258,493, I have found that it is advantageous to employ as the porous plug a fritted glass or like microporous disc on the order of 1.5 mm. and less in thickness, and that when such a disc is used, it is desirable to employ a backing member to support the disc. In the present embodiment, the electrodes of the cell constitute backing members for the disc. Here, the insulating ring 22 has a plain interior bore, and the thin microporous disc 23 of fritted glass or porcelain, is positioned transversely in the bore to divide the interior thereof into two chambers. Disposed each within one of these chambers, and in face-to-face contact with the disc 23, are permeable electrode bodies 24 and 25. As in the structure of Fig. 4, sealing gaskets 26 and 27 overlie the end faces of the ring 22, and the chambers are closed by flexible metal diaphragms 28 and 29. The electrode 24 is provided with a planar front face in contact with one face of the disc 23, and with an annular rear face 30 in contact with the metal diaphragm 28. Within the annular rear face 30, the electrode body 24 is recessed or cut away as indicated at 31 to provide free working space for the diaphragm 28. Similarly, the electrode 25 has a planar front face in contact with the other face of the disc 23, and an annular rear face 32 in contact with the diaphragm 29. Within the annular rear face 32, the electrode body 25 is recessed or cut away as indicated at 33 to provide free working space for the diaphragm 29.

The electrode bodies 24 and 25 are of sintered metal formed by the conventional method of molding and sintering metal powders. The metal employed is inert to the electrokinetic liquid employed; thus, when the electrokinetic liquid is acetonitrile, the sintered bodies 24 and 25 may advantageously be of aluminum. The sintered electrode bodies 24 and 25 are made adequately porous, by methods well known in the art of powder metallurgy, to provide for the necessary liquid flow between the diaphragms and the disc. Of course, in assembling the cell, the interior of the cell, including all of the voids of the disc 23 and electrodes 24 and 25, are filled with the electrokinetic liquid.

It will be noted that in the cell structure of Fig. 5, the permeable sintered metal bodies 24 and 25 form the electrodes of the cell, are in electrical contact with the diaphragms 28 and 29, and also serve to mechanically back up the thin, fragile disc 23. Of course, only one of the electrodes may be of the sintered metal body type, if desired, the other being of any other suitable type. Further, the electrode bodies 24 and 25 may be sintered metal plates or discs, rather than relatively thick bodies, and may then be embodied in cell structures of the type shown in Figs. 1–3.

Figure 6:
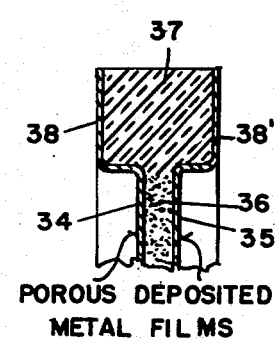
Fig. 6 is a fragmentary axial sectional view showing a portion of the porous plug and electrodes of an electrokinetic cell embodying the invention.

While, in all of the embodiments shown in Figs. 1–5, the electrodes are physically separate from the porous plug and are held in intimate contact with the plug by the mechanical structure of the cell, the electrodes may constitute porous metal films deposited directly on the faces of the plug. Thus, as shown in Fig. 6, the electrode films 34 and 35 are deposited directly upon the faces of the porous disc 36 so as to be intimately bonded thereto. While any suitable deposition method may be employed to establish such film electrodes, one preferable method comprises the conventional practice of coating by metal evaporation employed in the coating of optical lenses and the like. Where the metal electrode is deposited directly upon the face of the plug, as by evaporation, the deposition should be so controlled that the metal adheres only to the face or surface areas of the plug surrounding the pores and does not enter and clog the pores, nor bridge over the pore openings. Deposited porous film electrodes are highly advantageous because they provide very intimate contact between the electrode and the porous plug. When the cell structure is of the type shown in Fig. 6, including an outer ring 37 of glass or the like, the deposited electrodes may extend over the end faces of the ring, as at 38 and 38'. The use of deposited film electrodes is not limited to the cell structure of Fig. 6, however, and it is obvious that such electrodes may be incorporated in other cell structures, such as those shown in Figs. 1 and 3.

Figure 7:
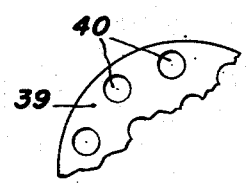
Fig. 7 is a fragmentary plan view of one type of electrode fabricated in accordance with the invention.

Yet another form of electrode in accordance with the invention is shown in Fig. 7, and comprises a metal sheet 39 provided with perforations 40. Such an electrode is particularly advantageous in cell structures such as that of Fig. 4, where the electrode is cup-shaped with the bottom of the cup in face-to-face contact with the porous plug and the edge of the cup bearing against the corresponding diaphragm or other cell chamber closure. By this arrangement, and employing a perforated metal electrode of considerable stiffness, positive backing support is provided for the plug. It will be obvious that a perforated metal electrode such as shown in Fig. 7 may be employed in the cell constructions illustrated in Figs. 1-3. It is also obvious that the perforations 40 may be of varying shapes and sizes. Further, such an electrode may be either a thin sheet or relatively thick perforated metal body similar to the porous sintered electrode bodies of Fig. 5.

While it is most advantageous to employ permeable electrodes extending in face-to-face contact with substantially the entire exposed face area of the porous plug, it will be understood that this represents only the most desirable embodiment. Where somewhat higher series electrode resistance is permissible, the electrode may cover only a portion of the face of the porous plug. Even when this is the case, the series electrode resistance is many times lower than pin electrodes and others previously proposed.

In the description of Figs. 1-5, the cell enclosing insulating members have been described, for simplicity, as rings. Ordinarily, it is simplest to employ a circular plug and annular insulating ring to match, and the electrodes are thus usually of the same plan shape as the plug. However, other shapes of plugs may be employed, and the electrodes may be made non-circular without departing from the invention.

I claim:

1. In an electrokinetic cell, the combination of a generally tubular enclosing member of electrical insulating material, a porous plug mounted within said enclosing member to divide the interior thereof into two chambers, a pair of permeable electrodes each positioned in one of said chambers in intimate contact with said plug and extending across substantially the entire adjacent exposed face of said plug, an electrically conductive flexible diaphragm secured across each end of said enclosing member to seal said chambers, said chambers being filled with an electrokinetic liquid, and a conductive member located in each of said chambers to connect each electrode electrically to its adjacent diaphragm and maintain said electrodes in contact with said plug.

2. In an electrokinetic cell, the combination of a generally tubular enclosing member of electrical insulating material, a porous plug secured within said enclosing member to divide the interior thereof into two chambers, a pair of permeable electrodes each positioned in one of said chambers in intimate face-to-face contact with said plug, an electrically conductive flexible diaphragm secured across each end of said enclosing member to seal said chambers, and an annular electrically conductive member positioned in each of said chambers and having one edge in contact with one of said electrodes and the other edge in contact with one of said diaphragms.

3. In an electrokinetic cell, the combination of a tubular electrical insulating shell having a transverse internal groove, a porous disc seated in said groove to divide the interior of said shell into two chambers, a permeable electrode extending across substantially the entire area of each face of said disc in intimate contact therewith, an electrically conductive diaphragm secured across each end of said shell to seal said chambers, said chambers being filled with an electrokinetic fluid, and means electrically connecting each of said diaphragms to the adjacent one of said electrodes.

4. In an electrokinetic cell, the combination of a generally tubular electrically insulating shell having a transverse shoulder on the inner periphery thereof, a porous disc seated against said shoulder to divide the interior of said shell into two chambers, a permeable electrode extending across substantially the entire area of each face of said disc in intimate contact therewith, an electrically conductive diaphragm secured across each end of said shell to seal said chambers, said chambers being filled with an electrokinetic fluid, and electrical conducting means in each of said chambers for connecting said electrodes to said diaphragms, the one of said electrical conducting means in the one of said chambers opposite said shoulder comprising a member bridging the distance in said one chamber between the corresponding electrode and diaphragm to maintain said disc seated against said shoulder.

5. In an electrokinetic cell, the combination of an annular insulating ring, a porous disc disposed within said ring and secured about its periphery thereto to divide the interior of said ring into two shallow chambers, an electrically conductive flexible diaphragm secured across each face of said ring to seal said chambers, and a permeable electrode of sheet form in each of said chambers, each of said electrodes overlying a face of said disc and the walls of one of said chambers and having its edge in electrical contact with one of said diaphragms.

6. In an electrokinetic cell, the combination of a generally tubular enclosure, a porous plug disposed within said enclosure to divide the interior thereof into two chambers, said chambers being filled with an electrokinetic liquid, a permeable metal electrode body in one of said chambers, and a flexible metal diaphragm disposed across an end of said enclosure to seal said one chamber, said electrode body having one face in intimate contact with said plug and the marginal portion of the opposite face in contact with said diaphragm.

7. In an electrokinetic cell, the combination of a generally tubular enclosure, a porous plug disposed within said enclosure to divide the interior thereof into two chambers, said chambers being filled with an electrokinetic liquid, a flexible metal diaphragm disposed across one of said chambers to seal the same, and a permeable sintered metal electrode body situated within said one chamber in intimate face-to-face contact with said plug and mechanically bridging the space between said plug and said diaphragm.

8. In an electrokinetic cell, the combination of a generally tubular enclosure, a porous plug disposed within said enclosure to divide the interior thereof into two chambers, said chambers being filled with an electrokinetic liquid, a flexible metal diaphragm disposed across one end of said enclosure to seal one of said chambers, and a permeable sintered metal electrode body situated within said one chamber, said electrode body having a planar face in intimate contact with said plug and an annular face in mechanical and electrical contact with said diaphragm, said electrode body being recessed within said annular space to provide a free working area for said flexible diaphragm.

9. In an electrokinetic cell, the combination of a generally tubular enclosure, a porous plug disposed within said enclosure to divide the interior thereof into two chambers, said chambers being filled with an electrokinetic liquid, and a permeable deposited metal film electrode carried by each face of said plug.

10. In an electrokinetic cell, the combination of an enclosure, a porous plug mounted within said enclosure to divide the interior thereof into two chambers, said enclosure being filled with an electrokinetic liquid, and an electrode in each of said chambers, at least one of said electrodes comprising a self-supporting permeable sintered metal body in intimate contact with said plug.

11. In an electrokinetic cell, the combination of an enclosure, a porous plug mounted within said enclosure to divide the interior thereof into two chambers, said enclosure being filled with an electrokinetic liquid, and an electrode in each of said chambers, at least one of said electrodes comprising a permeable deposited metal film carried directly on a face of said plug.

12. In an electrokinetic cell, the combination of a generally tubular enclosure, a self-supporting porous plug mounted transversely within said enclosure and sealed about its periphery to said enclosure to divide the interior thereof into two chambers, said chambers being filled with an electrokinetic liquid, two flexible electrically conductive diaphragms disposed one across each end of said enclosure to seal said chambers, and a pair of electrodes disposed one in each of said chambers, said electrodes each comprising a permeable electrically conductive element and each having one face disposed in intimate face-to-face contact with said porous plug, each of said electrodes being electrically connected to the adjacent one of said diaphragms.

13. In an electrokinetic cell, the combination of an enclosure having end faces and an internal bore communicating between said end faces, a self-supporting porous plug mounted transversely within said bore and sealed about its periphery to said enclosure to divide the interior thereof into two chambers, and a permeable deposited metal film electrode in each of said chambers, each electrode extending over the entire corresponding exposed face of said plug, the exposed wall of said bore and the corresponding end face of said enclosure, said chambers being filled with an electrokinetic liquid.

14. In an electrokinetic cell, the combination of an insulating ring, a porous plug disposed transversely within said ring and secured about its periphery to said ring to divide the interior thereof into two cup-like chambers, two electrically conductive flexible diaphragms disposed one across each face of said ring to seal said chambers, and a pair of cup-like permeable electrodes nested one in each of said chambers, each of said cup-like electrodes having its bottom face in intimate contact with said plug and its rim in electrical contact with the one of said diaphragms sealing the chamber in which that electrode is situated, said chambers being filled with an electrokinetic liquid.

EDWARD V. HARDWAY, Jr.

References Cited in the file of this patent

UNITED STATES PATENTS

| Number | Name | Date |
| --- | --- | --- |
| 1,162,213 | Blum | Nov. 30, 1915 |

OTHER REFERENCES

"Wissenschaftliche Forschungsberichte," by Prausnitz et al., Steinkopff; Dresden, 1931, p. 86.

"An Electrokinetic Transducer," by Williams, in Review of Scientific Instruments, October 1948, vol. 19, No. 10, pp. 640–646, particularly pp. 640 and 641.